United States Patent Office 3,550,431
Patented Dec. 29, 1970

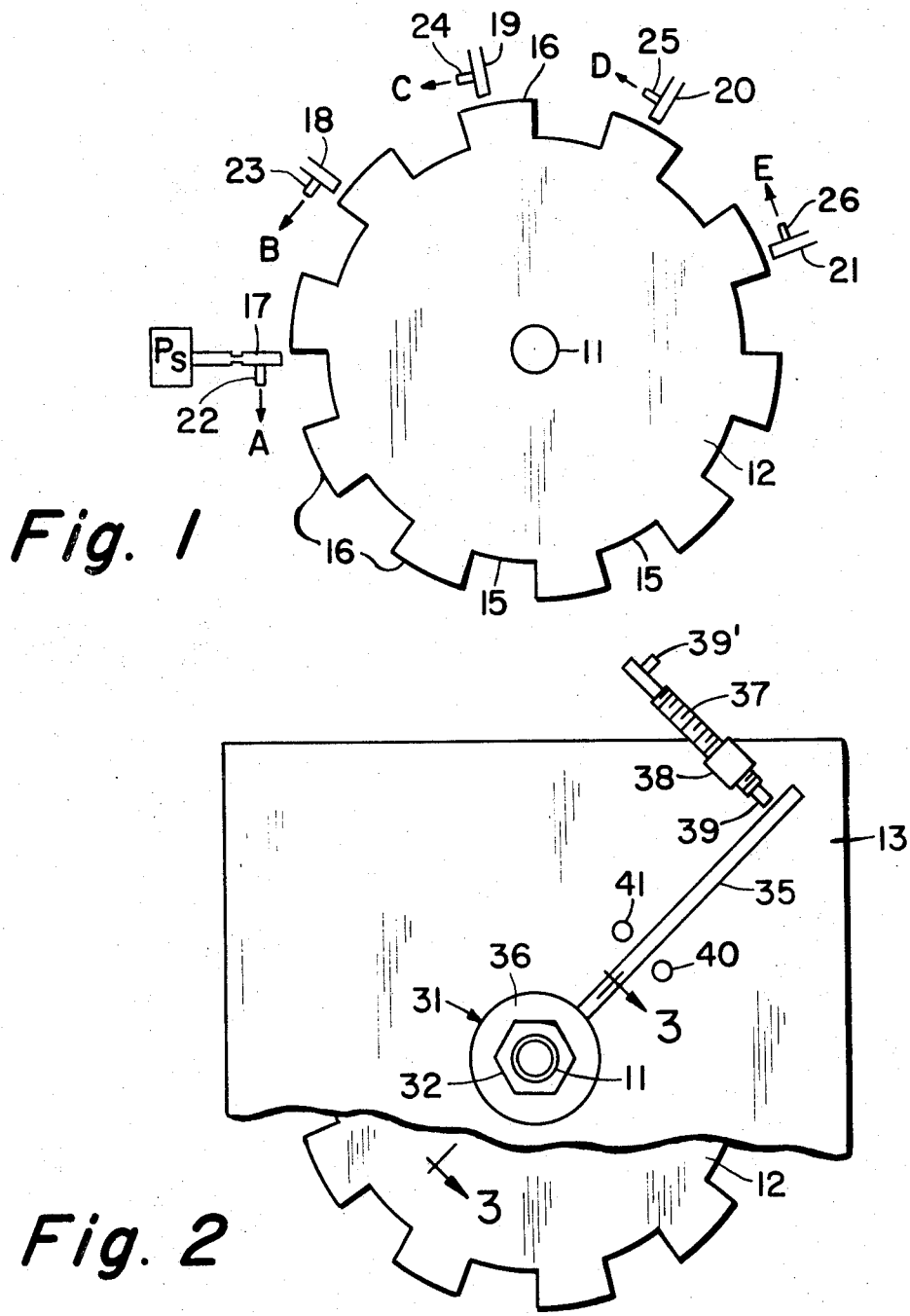

3,550,431
PNEUMATIC POSITION-DIRECTION TRANSDUCER AND CIRCUIT WITH WEIGHTED CODE OUTPUT
Gilbert A. Cotta, San Pedro, Calif., and Lawrence W. Langley, Corning, N.Y., assignors to Corning Glass Works, Corning, N.Y., a corporation of New York
Filed May 8, 1969, Ser. No. 822,991
Int. Cl. G01b 13/00
U.S. Cl. 73—37                                                    5 Claims

ABSTRACT OF THE DISCLOSURE

Apparatus for pneumatically sensing the angular displacement of a shaft relative to a predetermined reference and providing an indication of such displacement. A disc having a plurality of equal length teeth and slots around the periphery thereof is fixedly mounted to the shaft. A plurality of back pressure sensing probes adjacent the disc provide a plurality of fluid signals in the form of a Gray code. For each complete revolution of the disc, the Gray code is repeated a number of times which is equal to the number of teeth in the disc. A decoder circuit translates the Gray code into a weighted code, and a counter connected to the decoder circuit indicates the number of times which the Gray code is repeated.

BACKGROUND OF THE INVENTION

(I) Field of the invention

This invention relates to a pneumatic sensing device for use with fluid amplifier circuits, and more particularly to apparatus for pneumatically sensing the angular position of a rotating shaft as well as the number of revolutions which the shaft has made from an initial condition.

In numerically-controlled machine tools, the location of the table or carriage retaining a workpiece or the location of the operating tool must be controlled with respect to an arbitrary zero location. It is therefore necessary to provide means for sensing the actual position of the tool or table in order to determine the magnitude and direction of error between the actual positionment and the desired positionment, so that the correct mechanism may be actuated to drive the tool or table to the desired positionment.

(II) Description of the prior art

In conventional fluid controlled machine tool systems, such as those utilizing fluid amplifiers, the actual positionment of the tool or support table has been sensed by providing a suitably calibrated record carrier or binary coded device such as a longitudinal bar secured to a movable carriage supporting the tool or table, or a disc on the shaft of a lead screw utilized to position such tool or table. One such device is disclosed in U.S. Pat. No. 3,239,142 issued Mar. 8, 1966 to G. E. Levine. In accordance with this patent, the carrier or encoded device to be sensed is provided with means for representing various bit levels of a coded numeral, and in the case of the disc, such means are arranged in concentric rings of radially-spaced annular form. A plurality of conduits communicating with a source of fluid under pressure have outlets positioned adjacent the sensing device, which outlets are radially-aligned when utilized with the disc. Responsive to the position of the sensed device, the conduits pressurize certain fluid passages representing portions of the coded numeral, such as the various bit levels of a binary code. The fluid passages, being pressurized in response to the position of the encoded member or record carrier, which in the case of a disc is mounted on and rotatable with the lead screw shaft, provide a digital readout for locating the actual positionment of the tool or table with respect to an arbitrary zero position.

A number of disadvantages are inherent in the above-described prior art apparatus. If, for example, the angular position of the lead screw and therefore the coded disc are to be known within 1/100 of a revolution, then the coded disc is divided into one hundred positions, each of which provides a different set of digital output signals. The type of code which is used in this type of system is such that more than one digital signal may change as the disc rotates from one position to the adjacent position 1/100 of a revolution therefrom. Another limitation of this type of device arises from the inherent frequency limitations of fluid amplifiers, the upper operating frequency of which is about 100 Hz. Assuming that one hundred different codes are generated as the coded sensing disc rotates one revolution, then the maximum with which the disc can rotate and yet produce signals which are within 100 Hz., is one revolution per second.

SUMMARY OF THE INVENTION

It is therefore an object of the present invention to provide a pneumatic sensing system having digital readout means wherein the possibility of two or more digital signals changing together is avoided.

A further object of the invention is to provide improved apparatus for determining the angular positionment of a rotating shaft by pneumatic sensing means and representing such position by a digital pneumatic code, the code generating apparatus being such that the shaft is rotatable at a faster speed than heretofore possible, yet being compatible with conventional fluidic circuitry.

Presently used shaft position encoders use at least twice the number of back pressure sensing probes as are required by the present invention. The direction sensors in these systems produce the same number of pulses as the number of pulses which are to be counted. These characteristics considerably limit the frequency response of such encoders. Therefore, another object of this invention is to provide a fluidic shaft position encoder which overcomes the aforementioned disadvantages of prior art encoders.

The apparatus of this invention basically consists of a disc which is mounted on the lead shaft, the disc having a plurality of equal length teeth spaced by equal length slots around the periphery thereof. A plurality of pneumatic back pressure sensing probes is spaced around the periphery of the disc for providing a high pressure fluid signal in response to the presence of a tooth at the end thereof. The output signals from at least two of the probes, when taken together, provide in the form of a cyclic code such as the Gray code, a unique indication of specific angular orientations of the disc. As is well known, the advantage of the Gray code lies in the fact that successive coded characters differ in only one bit position. The output signals from the probes repeat $n$ times during each revolution of the disc, where $n$ is the number of teeth on the disc. Decoder means responsive to the output signals from the probes translates the Gray code signals into a weighted code that can be processed arithmetically. The decoder means also generates a count pulse every $360°/n$ of revolution of the shaft. Means are provided for generating a fluid direction signal that is indicative of the direction of rotation of the shaft. A fluidic counter connected to the decoder means receives and counts the count pulses, the direction signal being coupled to the counter for controlling the direction of count thereof. The condition of the counter indicates the angular orientation of the disc within an accuracy of $360°/n$ as well as the net number of complete revolutions through which the shaft has rotated.

BRIEF DESCRIPTION OF THE DRAWINGS

FIG. 1 is a plan view of a slotted disc and a plurality of pneumatic back pressure sensing probes for generating a set of pneumatic signals in the form of a Gray code.

FIG. 2 illustrates a mechanism for determining the direction of rotation of the slotted disc.

DESCRIPTION OF THE PREFERRED EMBODIMENT

Figure 3:
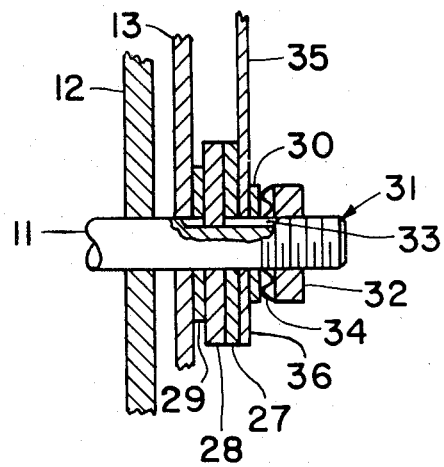
FIG. 3 is a cross-sectional view taken along lines III—III of FIG. 2.

Although the sensing apparatus of the present invention is particularly applicable to pneumatically operated numerically controlled machine tools, it is suitable for use with virtually any fluid-operated system; however, for the purposes of illustration, the invention will be described with respect to the positionment of a worktable forming a part of a numerically controlled machine tool. As shown in FIGS. 1–3, a shaft 11 to which the lead screw is attached, is rotatably mounted in a housing 13. Fixedly mounted on the shaft 11 within the housing is a slotted disc 12 which, in the disclosed embodiment, includes ten slots 15 evenly spaced between ten teeth 16, the width of the slots and the teeth each being 18°. Five fluid conduits 17–21 are radially disposed and slightly spaced from the surface of five of the teeth 16. These conduits could also be mounted parallel with the axis of the shaft 11 if they were so disposed with respect to the coded disc 12 that either a tooth or a slot were adjacent the end thereof. A source of fluid under pressure is connected through a restrictor to each of the conduits. For the sake of simplicity, FIG. 1 illustrates this connection only with respect to the conduit 17. A plurality of fluid passages 22–26 are connected to the conduits 17–21 in such a manner that they become pressurized by fluid supplied by the source in response to the presence of a tooth adjacent the end of a respective conduit. Fluid signals A through E are illustrated as being provided by the fluid passages 22–26. The assembly consisting of a fluid passage and its associated conduit will hereinafter be referred to as a back pressure sensing probe.

In the embodiment shown the corresponding edges of two adjacent teeth are spaced by 36°. The angular spacing between probes in this embodiment is (36m+3.6) degrees where $m$ is an integer. As shown in the drawing, the spacing between adjacent probes may be 39.6°. As an example of the permitted variation in spacing, the conduit 17 could be disposed adjacent the lower edge of the tooth below that tooth adjacent which that probe is actually shown. In such a modification, the angular spacing between the conduits 17 and 18 would be 75.6° instead of the illustrated 39.6°. These probes can be spaced in any other manner which maintains the relative angular position of 3.6° spacing between probes along some tooth, so long as the probes are not so closely spaced that one of them interferes with the operation of an adjacent probe.

A direction sensing arm 35 is mounted on a slip or friction type clutch 31 which permits a limited rotation of the arm 35 in response to a change in the direction of rotation of the shaft 11. The slip clutch 31, which is shown in greater detail in FIG. 3, includes an annular member 36 to which the arm 35 is attached. A washer 28 is keyed in a slot 33 in the shaft 11 so that it rotates therewith. A felt pad 27 is disposed between the washer 28 and the member 36 to provide a friction coupling therebetween. The assembly is completed by washers 29 and 30, a spring washer 34 and a nut 32. The washers 29 and 30 permit free rotation of the assembly including the washer 28, felt pad 27 and member 36. The nut is tightened against the spring washer 34 to provide the proper amount of friction between the felt pad 27 and the members adjacent thereto. A back pressure sensing probe 39 is secured to a threaded tube 37 which is disposed in a threaded bracket 38 that is affixed to the housing 13. The arm 35 is disposed between a pair of direction arm stops 40 and 41 which are spaced in such a manner that the end portion of the arm 35 changes its position relative to the probe 36 and therefore indicates a change in direction of a shaft 11 within $\frac{1}{100}$ of a revolution thereof. A source of fluid (not shown) is connected to the end of the probe 39 which is remote from the army 35. When the shaft 11 rotates clockwise as viewed in FIG. 1, the arm 35 moves away from the probe 39 and rests against the stop 40. When the shaft rotates counterclockwise, the arm 35 moves toward the probe 39 and rests against the stop 41. A pressure rise in the passage 39', which is connected to the probe 39, indicates that the arm 35 is adjacent the probe 39.

The passages 22–26 of FIG. 1 provide a set of digital pneumatic signals in the form of a Gray code. This set of signals is indicative of the angular orientation of the coding disc 12. Ten different combinations of signals A through E are produced as the disc rotates through $\frac{1}{10}$ of a revolution. The same series of pneumatic signals is generated ten times as the disc rotates through one complete revolution. It is a characteristic of the apparatus of FIGS. 1 and 2 that only one of the signals A through E changes as the disc rotates through $\frac{1}{100}$ of a revolution. By binary combination of two of the signals A through E, one being the signal which changes and one being a signal adjacent thereto, ten unique decimal signals are produced. Their logic equations are listed below in Table I.

TABLE I

| Decimal | 1 | 2 | 3 | 4 | 5 | 6 | 7 | 8 | 9 | 10 |
|---|---|---|---|---|---|---|---|---|---|---|
| Logic Signal | $B.\bar{A}$ | $C.\bar{B}$ | $D.\bar{C}$ | $E.\bar{D}$ | $\bar{E}.A$ | $A.\bar{B}$ | $B.\bar{C}$ | $C.\bar{D}$ | $D.\bar{E}$ | $E.A$ |

This completely represents the first decade of decimal numerals. The null position (decimal 1) is obtained by aligning the conduit 17 just beyond the edge of one of the teeth 16, the conduit 18 thereby being disposed adjacent the corresponding edge of the top surface of another of the teeth 16. When fluid is applied to the probes, the passage 22 thus produces the signal $\bar{A}$ and passage 23 produces the signal B. Combining the signal ($\bar{A}$) with the signal (B), the decimal (1) is obtained. Upon rotating the disc 12 one hundredth of a revolution in a clockwise manner as viewed in FIG. 1, the tooth 16, which had been adjacent the conduit 18, moves away from the conduit 18, the end of the conduit 19 remaining blocked by an adjacent tooth. The logic signal $C \cdot \bar{B}$ is therefore indicative of the decimal number (2). In a similar manner, the logic signals listed in Table I are generated to indicate the decimal positions 3 through 10. Since the numbers 1 through 10 are repeated ten times for each revolution, the decimal 10 along with the direction sensing signal can be fed to a bidirectional counter, to be hereinafter described, the output of which is indicative of both the angular position of the disc 12 and also the total number of revolutions through which the disc has rotated.

The accuracy of the disclosed system is enhanced by the generation of a Gray code wherein only one signal or bit changes as the disc rotates from one position to the next. However, since signals in the form of a Gray code cannot be directly processed by computing equipment, the signals A through E from FIG. 1 must be translated into a weighted code that can be arithmetically processed.

Figure 4:
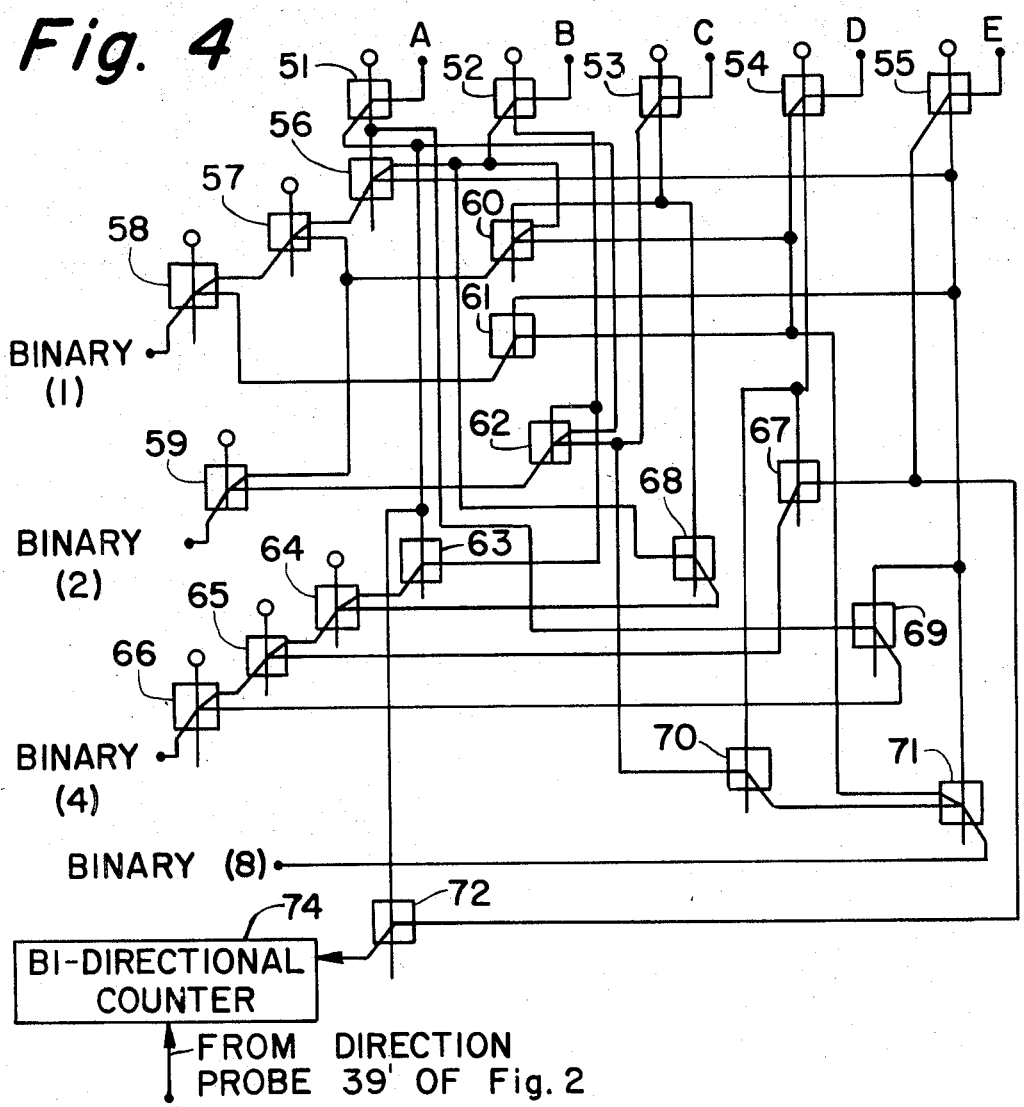
FIG. 4 is a schematic diagram of a fluidic logic circuit for translating the Gray code generated by the apparatus of FIG. 1 into a weighted code.

FIG. 4 is a schemaatic diagram of a fluidic logic circuit which translates or decodes the fluid signals A through E, which are generated in the passages 22–26 of FIG. 1, into binary signals. This circuit consists entirely of fluidic OR/NOR gates having one or two control inputs, the power stream input of some of these gates being connected to an output of a previous gate to provide an AND gate function. The fluid signals A through E from FIG. 3 are connected to the control inputs of the OR/NOR gates 51–55, respectively. These gates produce signals A through E and their inverses $\overline{A}$ through $\overline{E}$. Table II lists the logic equations of the functions performed by the circuit of FIG. 4 in order to provide the binary signals 1, 2, 4 and 8.

Table II

| | |
|---|---|
| Binary (1) | $\overline{A}(B+\overline{E})+\overline{C}(D+B)+D\cdot\overline{E}$ |
| Binary (2) | $\overline{C}(D+B)+\overline{B}(C+A)$ |
| Binary (4) | $E\cdot\overline{D}+\overline{E}\cdot\overline{A}+A\cdot\overline{B}+B\cdot\overline{C}$ |
| Binary (8) | $\overline{C}\cdot\overline{D}+D\cdot\overline{E}$ |
| Decimal 10 | $E\cdot A$ |

The binary (1) output must exist for all of the odd decimal numbers. The equation in Table II for binary (1) is therefore a combination of all of the odd decimal numbers listed in Table I. The equations for generating binary numbers (2), (4), and (8) are similarly obtained. The fluidic circuit shown in FIG. 4 is merely illustrative of a number of circuits which can provide the decode functions set forth in Table II.

The circuit of FIG. 4 provides a binary (1) output in the following manner. A circle connected to the power stream input of some of the gates indicates the connection of a constant pressure source to those particular inputs. The NOR output from gate 51 is coupled to the power stream input of gate 56. The OR output from gate 52 and the NOR output from gate 55 are connected to the two control inputs of gate 56. The OR outputs from gates 52 and 54 are connected to the two control inputs of gate 60, the power stream input of which is connected to the OR output of gate 53. The OR outputs from the gates 56 and 60 are connnected to the two control inputs of the gate 57. The OR output of the gate 54 is connected to the control input of gate 61, the power stream inlet of which is connected to the OR output of gate 55. The OR outputs from gates 57 and 61 are connected to the two control inputs of gate 58, the OR output of which is the binary 1 signal. In a similar manner, the binary (2) signal is obtained by a suitable combination of the gates 51–54, 59, 60 and 62; the binary (4) signal is obtained by a suitable combination of the gates 51, 52, 54, 55 and 63–69; and the binary (8) signal is obtained by a suitable combination of the gates 53–55, 70 and 71.

The decimal (10) signal is obtained by coupling the OR output from gate 51 to the power stream inlet of gate 72, the control inet of which is connected to the OR outlet of gate 55. The decimal (10) signal, which appears at the OR outlet of the gate 72, is coupled to the input terminal of a bidirectional counter 74. This counter may be of the type which is disclosed in U.S. Pats. Nos. 3,399,829 issued to E. F. Richards et al. and 3,199,782 issued to J. N. Shinn. The signal which controls the counting direction is supplied to the counter from the probe 39′ of FIG. 2. Since the direction in which these counters count is determined by the application of a positive fluid signal to one of two count direction terminals, the fluid signal provided by the terminal 39′ of FIG. 2 would have to be applied to the control input terminal of a monostable fluid amplifier, the two output passages of which would be connected to the two count direction terminals, respectively.

If the shaft were to rotate 0.75 revolution from its arbitary zero condition, the counter readout would indicate 7 and the binary outputs would indicate 5. If the disc were to rotate 3.69 revolutions, the counter readout would indicate 36 and the binary outputs would indicate 9. If it were necessary to rotate the shaft 11 through a high number of revolutions, it is possible to rotate the shaft at such a high speed that the binary outputs from the circuit in FIG. 4 would be changing too fast to be utilized by fluidic circuitry. However, the maximum frequency of the count pulses coupled to the counter 74 is only 1/10 of the maximum frequency of the binary pulses. Therefore the shaft can be rotated at a slew rate which produces binary signals the frequency of which is too high to be utilized by fluidic components, the count pulses being within the acceptable maximum frequency. When the counter output indicates that the desired position is being approached, the speed of shaft rotation is decreased to such an angular velocity that the binary output signals can indicate the position of the shaft 11 with an accuracy of 1/100 revolution.

Numerous modifications can be made to the preferred embodiment described hereinabove without departing from the scope of this invention. The number of teeth in the disc 12 as well as the spacing therebetween could vary in accordance with the desired accuracy or the system of numbers which is employed. It has been convenient to describe the preferred embodiment in terms of the decimal system, but this invention is not limited to such a system. Also, the number of back pressure sensing probes can be changed.

We claim:

1. Apparatus for pneumatically sensing the angular displacement of a shaft relative to a predetermined reference position and providing an indication of such displacement, said apparatus comprising a disc fixedly mounted on said shaft, said disc having a plurality of equal length teeth around the periphery thereof, and a plurality of equal length slots defined by the spaces between said teeth, a plurality of pneumatic, back pressure sensing probes spaced around the periphery of said disc, each of said probes providing a low pressure output fluid signal when one of said slots is adjacent the end thereof, and an output fluid signal of higher pressure than said low pressure when one of said teeth is adjacent the end thereof, the output signals from at least two of said probes when taken together providing in the form of a Gray code an indication of specific angular orientations of said disc, the output signals from said probes repeating $n$ times during each revolution of said disc, when $n$ is the number of teeth on said disc, decoder means responsive to the output signals from said probes for translating said Gray code signals into a weighted code which can be processed arithmetically, said weighted code indicating the angular orientation of said disc with an accuracy greater than the angle subtended by one of said teeth, said decoder means also generating a count pulse every $360°/n$ of revolution of said shaft, means for generating a fluid direction signal that is indicative of the direction of rotation of said shaft, fluid pulse counter means connected to said decoder means for receiving and counting said count pulses, said direction signal being coupled to said counter means to control the direction of count thereof, the output of said counter means indicating the angular orientation of said disc within an accuracy of $360°/n$ in addition to indicating the number of complete revolutions through which said shaft has rotated, the accuracy with which said counter means indicates angular orientation being less than that of said decoder means.

2. Apparatus in accordance with claim 1 wherein the length of said slots is equal to the length of said teeth.

3. Apparatus in accordance with claim 1 wherein the number of probes is 5 and the number of teeth is 10, whereby each 36° of rotation of said shaft results in the generation of ten different combinations of output signals from said probes.

4. Apparatus in accordance with claim 3 wherein the spacing in degrees between probes is $(36m+3.6)$, where $m$ is an integer.

5. Apparatus in accordance with claim 1 wherein said means for generating a fluid direction signal comprises a direction arm, clutch means connecting said direction arm to said shaft, means to limit the amount of rotation of said direction arm, and a pneumatic back pressure sensing direction probe adjacent said arm, whereby said arm either prevents or permits the flow of fluid from said direction probe depending on the direction of rotation of said shaft.

References Cited

UNITED STATES PATENTS

| | | | |
|---|---|---|---|
| 3,190,554 | 6/1965 | Gehring, Jr. et al. | 235—201 |
| 3,239,142 | 3/1966 | Levine | 235—201 |
| 3,416,358 | 12/1968 | Davis et al. | 73—37 |
| 3,433,238 | 3/1969 | Nightingale | 235—201X |
| 3,491,229 | 1/1970 | Mityashin et al. | 235—201 |

LOUIS R. PRINCE, Primary Examiner

W. A. HENRY II, Assistant Examiner

U.S. Cl. X.R.

235—201